United States Patent [19]
Meng

[11] Patent Number: 5,934,622
[45] Date of Patent: Aug. 10, 1999

[54] MICRO-ELECTRODE AND MAGNET ARRAY FOR MICROTURBULENCE CONTROL

[75] Inventor: James C. S. Meng, Portsmouth, R.I.

[73] Assignee: The United States of America as represented by the Secretary of the Navy, Washington, D.C.

[21] Appl. No.: 08/846,899

[22] Filed: May 1, 1997

[51] Int. Cl.$^6$ .................................................. B64C 21/00
[52] U.S. Cl. ........................... 244/205; 244/204; 244/130
[58] Field of Search ..................................... 244/204, 205, 244/130; 114/67 R

[56] References Cited

U.S. PATENT DOCUMENTS

| | | | |
|---|---|---|---|
| 3,360,220 | 12/1967 | Meyer ...................................... | 244/205 |
| 4,516,747 | 5/1985 | Lurz ......................................... | 244/204 |
| 5,273,465 | 12/1993 | Meng ................................ | 114/67 R X |
| 5,320,309 | 6/1994 | Nosenchuck et al. ................... | 244/205 |
| 5,359,951 | 11/1994 | Meng ..................................... | 114/67 R |
| 5,437,421 | 8/1995 | Nosenchuck et al. .............. | 244/204 X |
| 5,791,275 | 8/1998 | Bandyopadhyay .................... | 114/67 R |

Primary Examiner—Charles T. Jordan
Assistant Examiner—Christopher K. Montgomery
Attorney, Agent, or Firm—Michael J. McGowan; Prithvi C. Lall; Robert W. Gauthier

[57] ABSTRACT

A boundary layer control device for a surface which reduces turbulence by providing forces which counteract microturbulent events occurring at the surface. The microturbulent events occur periodically with a known topography and include liftup and ejection, bursting, low-speed streak and sweep topography. The device has an array of magnet and electrode cells which are arranged to correspond with the topography arrangement of the microturbulent events. The interaction of the magnetic and electric fields within the cells generate a Lorentz force which can be directed into or out of the surface depending on the relative directions of the magnetic and electric fields. Sensors on the surface determine which cells to activate and in what direction to apply the Lorentz force to precisely counteract the microturbulent events occurring at the surface. A force directed away from the surface is used to counteract a sweep event and a force directed towards the surface counteracts a liftup event. No force is applied during low-speed streak events.

11 Claims, 5 Drawing Sheets

FIG. 6

MICRO-ELECTRODE AND MAGNET ARRAY FOR MICROTURBULENCE CONTROL

STATEMENT OF GOVERNMENT INTEREST

The invention described herein may be manufactured and used by or for the Government of the United States of America for governmental purposes without the payment of any royalties thereon or therefore.

CROSS-REFERENCE TO RELATED APPLICATIONS

This patent application is co-pending with a related patent application entitled Method for Controlling Microturbulence (application Ser. No. 08/846,894 by the same inventor as this patent application.

BACKGROUND OF THE INVENTION (1) Field of the Invention

This invention relates to an apparatus for controlling the flow of an electrically conducting medium along a surface and more particularly to an array of magnets and electrodes for actively controlling the naturally occurring microturbulence in the boundary layer adjacent the surface.

(2) Description of the Prior Art

It is well known in the art that control of turbulence and vorticity in the boundary layer flow around a surface moving through a medium, such as a marine hull moving through seawater, reduces both drag and radiated noise. Additionally, fluid dynamically loaded surfaces, such as diving planes and rudders, or thrusting surfaces, such as propellers or screws, can operate at higher performance coefficients when boundary layer control systems are used. Historically, there have been two approaches to reducing drag or turbulence: delaying the laminar to turbulent transition by maintaining laminar flow near the surface; and reducing turbulence intensity in a turbulent state. Various approaches to maintaining laminar flow have been tried including shaping of the surface, heating the surface and providing suction at the surface to prevent or delay the transition into turbulent flow. However, laminar flow controls normally require very stringent surface smoothness, i.e., to within several tens of microns. Further, laminar flow control is susceptible to ambient disturbances which can trigger the transition from laminar to turbulent flow. Also, such control methods may result in large volumetric space penalties. Turbulent drag reduction efforts include injection of a polymer or microbubbles into the boundary layer flow adjacent the surface, vortex generators and electromagnetic control in electrically conducting media. Polymer and microbubble injection require additional space and weight for carrying the injection media. Vortex generators require movable wetted areas. Electromagnetic control of turbulence through the application of Lorentz forces holds very high potential for turbulent drag reduction. However, in the current state of the art, as exemplified by Nosenchuck et al., U.S. Pat. Nos. 5,320,309 and 5,437,421, the application of forces is not optimized for the flow conditions over the surface. The spacing of the Lorentz force generators and the timing of the application of the Lorentz forces are not consistent with the microturbulent phenomenology. For the checkerboard pattern of Lorentz force generators in the '421 patent, recent experimental results indicate minimal drag reductions for the majority of test cases with a small number of tests having skin friction reductions of up to 8%.

SUMMARY OF THE INVENTION

Accordingly, it is a general purpose and object of the present invention to provide a turbulent boundary layer control device for reducing turbulence and hydrodynamic drag.

It is a further object of the present invention that the device provide turbulence control without the need for stringent surface smoothness.

It is a still further object of the present invention that the device not add significantly to the weight, space, or power requirements of the surface over which turbulence is to be controlled.

It is another object of the present invention that the device apply timely boundary layer control where it is needed to precisely counteract the microturbulent events occurring at the surface.

These and other objects are provided with the present invention by an array of micro magnets and micro electrodes at the surface. The magnets create a steady magnetic field within the medium and an alternating current through the electrodes generates an electric field. The combination of the magnetic and electric fields provides the Lorentz pressure vector over a cell of the array surrounded by the magnetic and electric poles. The array is configured such that the cell pattern is consistent with the occurrence of microturbulent events at the surface. In particular, experimental measurements have shown that the occurrence of near-wall or surface microturbulent events is a repetitive series of four definitely separate events: liftup and ejection, breakup, low-speed streak and high speed sweep towards the surface. Starting from a relatively quiescent surface flow, negative wall pressure lifts and ejects the low momentum medium from the surface until the medium experiences chaotic fluctuations called breakup. A low speed streak moves downstream along the surface until a high momentum sweep resulting from the previous breakup moves downward toward the surface and interact with the low speed streak to begin the liftup and ejection phase once more. Experiments have also established the spacing of these microturbulent events in both the direction of flow and transverse to the flow. The array cells are spaced over the surface to correspond with the known spacing of the microturbulent events. Shear stress and wall pressure sensors are used to predict the next most likely state or microturbulent event. If a liftup and ejection event is expected, the proper electrodes are activated to produce a counteracting Lorentz force directed towards the surface. Similarly, the expectation of a high speed sweep results in a Lorentz force directed away from the surface to counteract the downward pressure from the sweep. No Lorentz forces are applied during the breakup or low speed streak phases. Breakup occurs away from the surface after the flow is lifted from the surface. A Lorentz force applied at or near the surface would have no appreciable effect on the breakup event. During low speed streak, the flow resembles laminar flow and application of a Lorentz force either towards or away from the surface would enhance, rather than control, turbulence. Since appropriately applied Lorentz forces provide turbulence control, surface smoothness need not be as stringently controlled as with prior art methods for maintaining laminar flow. Since the array of the present invention is intended to control microturbulent events at the surface, the array is placed directly at the surface and the size and weight of the magnet and electrode cells making up the array can be kept to a minimum.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
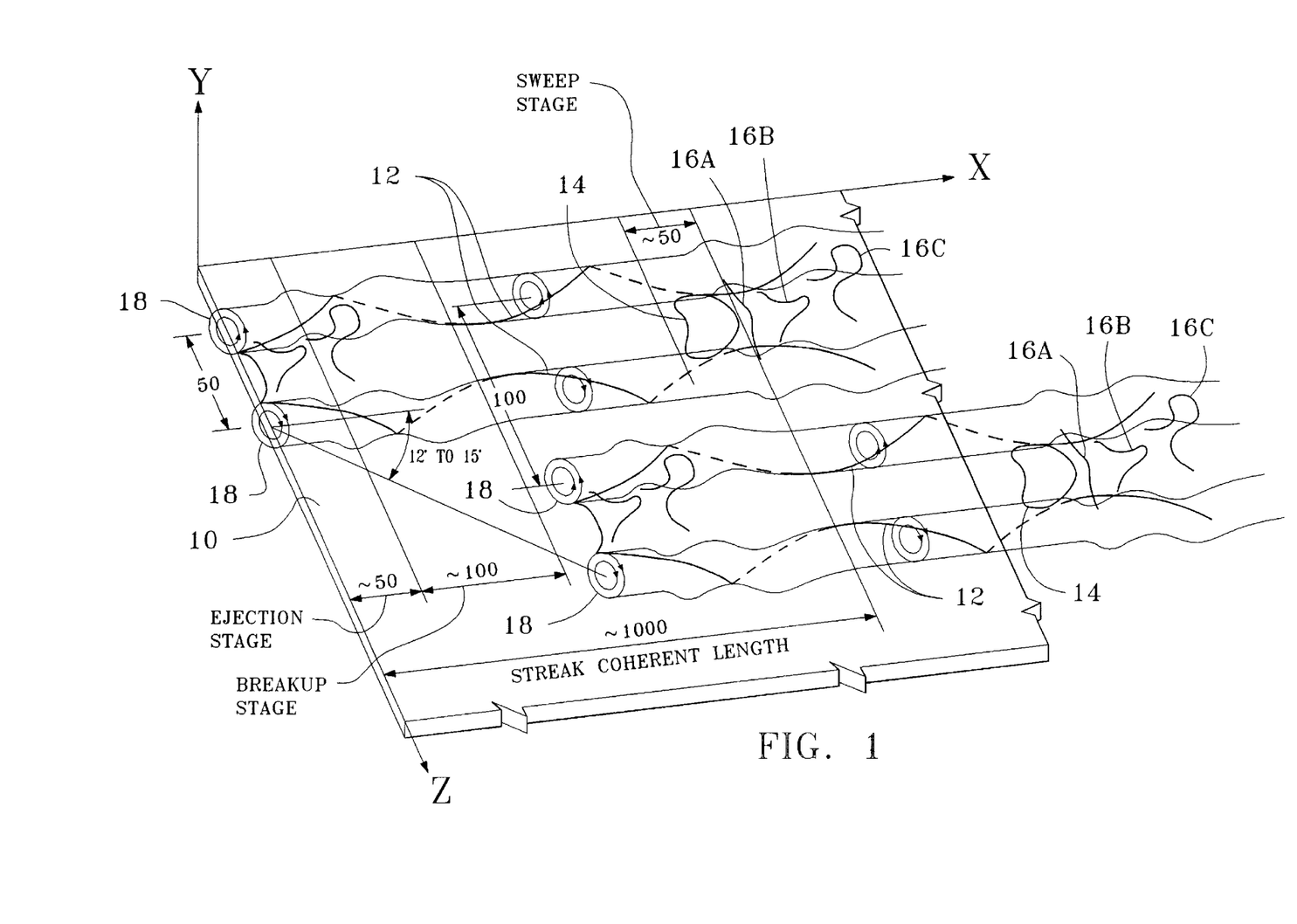
FIG. 1 depicts a conceptual schematic of repetitive microturbulent events at a surface.

Referring now to FIG. 1, there is shown a three dimensional conceptual schematic of microturbulent events at a surface 10. FIG. 1 is based on the inventor's recently published "Wall Layer Microturbulence Phenomenological Model and a Semi-Markov Probability Predictive Model for Active Control of Turbulent Boundary Layers", *Hydrodynamics*, NUWC Division Newport Technical Digest, August 1996, which is incorporated into this disclosure in its entirety by reference. The paper presents an extensive review of the published database of wall layer microturbulent events and organizes the comprehensive experimental database and numerical simulation findings into a coherent framework for engineering application to drag and noise control. The review indicated that turbulent boundary layer drag is dominated by the turbulence production process which, in turn, is characterized by identifiable discrete microturbulence events. As is well known, there is a quasi-periodic, three-stage sequence of events in the near-wall region of turbulent boundary layers called bursting. This bursting is a continuous chain of events starting from a relatively quiescent wall flow. It involves the slow lifting of a low-speed streak, the formation of a relatively large, rapidly growing oscillatory motion followed by relatively chaotic fluctuations called breakup. It is also known that the low-speed streak-lifting or breakup is triggered by large disturbances (implying "away from the wall") already present in the flow and, hence, preceding the liftup. These disturbances comprise an element of accelerated fluid originated farther away from the wall that occurs after the appearance of a low-speed wall streak. This phenomenon is referred to as sweep, and the interaction between sweep and low-speed streaks is fundamental to the ejection or lifting process. The sweep is essentially generated by the interaction of an earlier bursting farther upstream with the fluid motion in the logarithmic region. Wall disturbances grow slowly and eventually lift up. The velocity field is then perturbed in the region directly above the oscillating wall layer. Near the end of the burst's oscillatory growth, interaction between the burst fluid and the motion in the logarithmic region causes the formation of another large vortex-like structure; this structure then creates a large wallward-moving disturbance, or sweep, in the outer flow which leads to another liftup process farther downstream, thus completing the quasi-periodic sequence.

In FIG. 1, the low-speed streak is indicated by curves 12. The interaction of the sweep and the low-speed streak is indicated by the closed loops 14. Liftup and ejection are sequentially represented by curves 16a, 16b and 16c. The spanwise, streamwise and vertical spatial characteristics of the microturbulent events herein described have been measured and are as shown in FIG. 1. The spanwise center-to-center spacing of counterrotating vortices, represented by ellipses 18, has been found to be $\Delta z^+ \approx 50$ with a streamwise spacing of $\Delta x^+ 1200$. Additionally, the ejection stage, the breakup stage and sweep stage have been shown to extend streamwise for $\Delta x^+ 50$, 100 and 50, respectively. Further, the half-angle between one upstream sweep and two downstream ejections has been found to be between 12° to 15°.

The microturbulent event chain therefore includes four identifiable discrete events: sweep; vortex formation, liftup or ejection; breakup; and low-speed streak. Given the natural evolution of microturbulent events described herein, the transition probability from one event into the next is nearly one without external influence or physical phenomena to reverse the transition. Conversely, the reverse transition probabilities from any state to the previous state are zero, except the eventual low-speed streak to sweep state. The observed quasi-periodic nature of the coherent microturbulent events that are taking place randomly in a spatial dimension near the wall can be applied to predict the occurrence of the next microturbulent event, thereby offering an opportunity to activate an opposing remote Lorentz pressure gradient to inhibit the turbulence production process. In other words, the turbulence control is based on applying Lorentz pressure gradients toward the wall during predicted liftup, Lorentz pressure gradients away from the wall during predicted sweep, and no pressure gradients during the low-speed streak. This is the fundamental basis of estimator-predictor feedback control of turbulence based on the known, dependent, random microturbulent event processes. By sampling the wall shear stress and pressure fluctuations and obtaining a real-time solution based on the well-known Markov probabilistic model, the microturbulent state can be predicted and the Lorentz pressure gradients applied, which should result in a total turbulent drag reduction. The objective is not to eliminate turbulence totally, but only to inhibit turbulent ejection and sweep, allowing the low-speed streaks to exist and persist since they contribute to the most naturally stable mode of flow near the wall and are responsible for a low level of shear stress and, thus, low skin-friction drag.

The wall layer microturbulent events at any particular location are mutually dependent and can be related to the well known birth-and-death Markov chain in probabilistic analysis. The transition probabilities and the distinctive states are characterized by the percentage of time resident in each state. In terms of the four mutually exclusive microturbulent states with 1 for low-speed streak, e for ejection, b for breakup and s for high-speed sweep, and if one further assumes that the microturbulent states follow a continuously cyclic process; in other words, the transition probabilities are nonzero only for those states in the observed sequence, the well known Chapman-Kolmogorov equation becomes:

$$p_e'(t) = -\mu_e p_e(t) + \lambda_{se} p_s(t),$$
$$p_b'(t) = -\mu_b p_b(t) + \lambda_{eb} p_e(t)$$
$$p_s'(t) = -\mu_s p_s(t) + \lambda_{ls} p_l(t)$$
$$p_l(t) + p_e(t) + p_b(t) + p_s(t) = 1, \qquad (1)$$

where ' represents the time derivative, $\mu_i$ the arrival rates and $\lambda_{ji}$ the transition probabilities. Equation (1) can be solved analytically if all $\lambda_{ji}$'s and $\mu_i$'s are constants.

In the case of fully developed turbulent flows without externally applied unsteady forces, one expects that the stochastic process will asymptote to the limiting states; i.e., the time derivatives will vanish, so that a stationary stochastic process can be established. This is mathematically possible if the regeneration rates and transition probabilities follow the known sequence and, therefore, the following conditions:

$$\mu_e + \lambda_{eb} = 1,$$
$$\mu_b + \lambda_{bl} = 1,$$
$$\mu_s + \lambda_{se} = 1,$$
$$\mu_l + \lambda_{ls} = 1. \qquad (2)$$

With some rearrangement and substitution, solutions can be established in terms of the arrival rates $\mu$'s:

$$p_l = 1 \bigg/ \left(1 + \frac{1-\mu_l}{\mu_s} + \frac{(1-\mu_l)(1-\mu_s)}{\mu_s \mu_e} + \frac{(1-\mu_l)(1-\mu_s)(1-\mu_e)}{\mu_s \mu_e \mu_b}\right), \qquad (3)$$

$$p_s = \frac{(1-\mu_l)}{\mu_s} p_l,$$

$$p_e = \frac{(1-\mu_s)}{\mu_e} \frac{(1-\mu_l)}{\mu_s} p_l,$$

$$p_e = \frac{(1-\mu_e)}{\mu_b} \frac{(1-\mu_s)}{\mu_e} \frac{(1-\mu_l)}{\mu_s} p_l.$$

These rates can be determined experimentally from the mean time between arrivals. For practical applications, the arrival rates for ejection $\mu_e$, breakup $\mu_b$, and sweep is can be assumed to be the same as the experimentally measured burst rate. The arrival rate for the low-speed streaks pi can be estimated by multiplying the burst rate by the ratio of streak coherence length to ejection and burst length, or by the ratio of burst period to combined individual ejection-breakup-sweep duration.

The turbulence control methodology of the present invention is to mitigate or minimize the occurrence of microturbulent events through the use of externally applied forces. When an external influence is activated, the transition probabilities are no longer certain and the sequential order of the events may not be preserved. In order to solve for the unsteady case, two assumptions must be made. First, the arrival rates are assumed to be independent of time, as the experimental data indicate for the natural turbulent boundary layer. Second, it is assumed that the time-varying state probability does not depend on how much control is to be imposed. Given that the control methodology is based on inhibiting turbulence rather than on totally eliminating it, the rate of change of state probabilities should be small compared with the limiting state probabilities. This satisfies the first assumption and the second assumption is satisfied by using only marginal control to maintain the turbulent state at a lower level of turbulence production. Given the validity of the assumptions, the differential equations can be solved versus time. With the initial boundary conditions $p_l(0)$, $p_s(0)$, $p_e(0)$ and $p_b(0)$ equal to the limiting state probabilities in natural turbulent boundary layers, equation (3), the differential equations based on equation (1) can be represented by $$\frac{d}{dt}\begin{bmatrix} p_s \\ p_e \\ p_b \end{bmatrix} = \begin{bmatrix} -(\mu_s + 1 - \mu_l) & -(1-\mu_l) & -(1-\mu_l) \\ 1-\mu_s & -\mu_e & 0 \\ 0 & 1-\mu_e & -\mu_b \end{bmatrix}\begin{bmatrix} p_s \\ p_e \\ p_b \end{bmatrix} + \begin{bmatrix} 1-\mu_l \\ 0 \\ 0 \end{bmatrix}. \qquad (4)$$

Equation (4) has the exponential solution $e^{\alpha t}$, where the $\alpha$'s are eigenvalues of the coefficient matrix, i.e., solutions of the following equation:

$$(\alpha+\mu_s+1-\mu_l)(\alpha+\mu_e)(\alpha+\mu_b)-(\alpha+\mu_b)(1-\mu_s)(1-\mu_l)+(1-\mu_s)(1-\mu_e)(1-\mu_l)=0 \qquad (5)$$

The total solution is therefor $$\begin{bmatrix} p_s \\ p_e \\ p_b \end{bmatrix} = \begin{bmatrix} p_{sh} \\ p_{eh} \\ p_{bh} \end{bmatrix} e^{\alpha t} + \begin{bmatrix} p_{sn} \\ p_{en} \\ p_{bn} \end{bmatrix}, \; p_l = 1 - p_s - p_e - p_b, \qquad (6)$$

where the first term is the eigen solution of equation (5) and $$\begin{bmatrix} p_{sn} \\ p_{en} \\ p_{bn} \end{bmatrix} = \frac{1-\mu_l}{\mu_b\mu_e(1-\mu_l+\mu_s)+\mu_b(1-\mu_l)(1-\mu_s)+\mu_e(1-\mu_l)(1-\mu_e)} \times \begin{bmatrix} \mu_b\mu_e \\ \mu_b(1-\mu_s) \\ (1-\mu_e)(1-\mu_s) \end{bmatrix}. \qquad (7)$$

Figure 2:
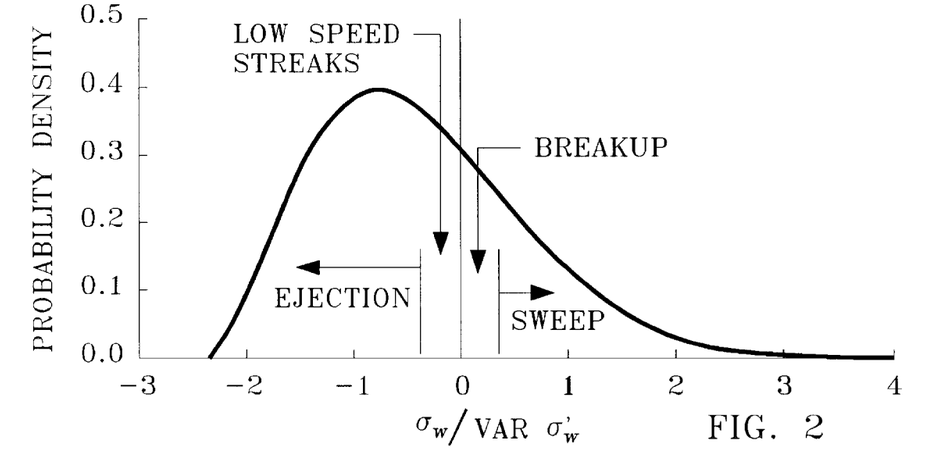
FIG. 2 is a plot of the Probability Density Function (PDF) of wall shear stress fluctuation.
Figure 3:
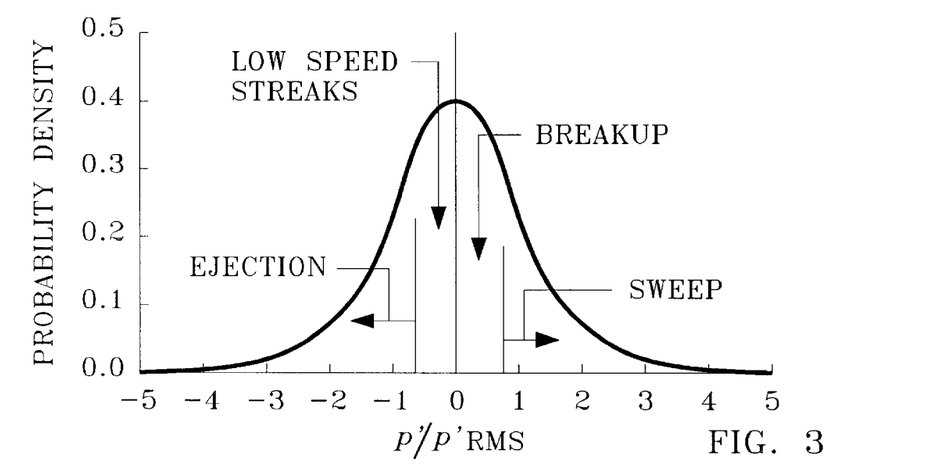
FIG. 3 is a plot of the PDF of wall pressure fluctuation.

Two familiar ways of presenting turbulent boundary layer data are the wall shear stress and the wall pressure probability histograms, shown in FIG. 2 and FIG. 3, respectively. Both can be conceptually useful indicators for purposes of microturbulent event control. It is well known that shear stress is dominated by small-scale eddies near the wall, while the wall pressure power density results from both large eddies away from the wall and small eddies near the wall. So, in a global sense, the wall shear stress fluctuations exist primarily as a consequence of the inner wall events, while the wall pressure fluctuations are due to both inner and outer wall events. The low end of the wall shear stress histogram represents the vortex liftup, ejection, and breakup part of the cycle, while the high end of the histogram indicates the sweep part of the cycle. Similarly, the wall pressure histogram provides another cross-examination of the local microturbulent events, where the shear stress and wall pressure probes are located adjacent to each other.

The step by step methodology for estimating the current state of the turbulent boundary layer in the presence of applied external forces can now be described. The PDF's of wall shear stress $\sigma_w$ and wall pressure fluctuation p' are shown in FIG. 2 and FIG. 3, respectively. Because of the induced counterflow by ejection, ejection has a negative local shear stress fluctuation so that the first demarcated region is the ejection. Then comes the low-speed streak which generates the lowest level of shear stress fluctuation. There is little or no specific measurement data describing how the breakup state affects the local shear stress fluctuation. Intuitively, however, one would expect that the shear stress fluctuation would be higher than the mean during breakup, so that it occupies the third region, just to the right of the mean shear stress value. During the sweep state, experimental evidence indicates increased shear stress fluctuation because high-momentum fluid from the logarithmic region is imparted toward the wall; therefore, the sweep state is at the high end of the shear stress PDF. With this relative ranking given, and with knowledge of the limiting probability of each state in a naturally occurring turbulent boundary layer (which equates to the areas under each region), one can then demarcate the PDF into nonoverlapping regions. The nonoverlapping comes from the fact that the four discrete states are mutually exclusive and exhaustively collective to describe the entire microturbulent cycle.

Figure 4:
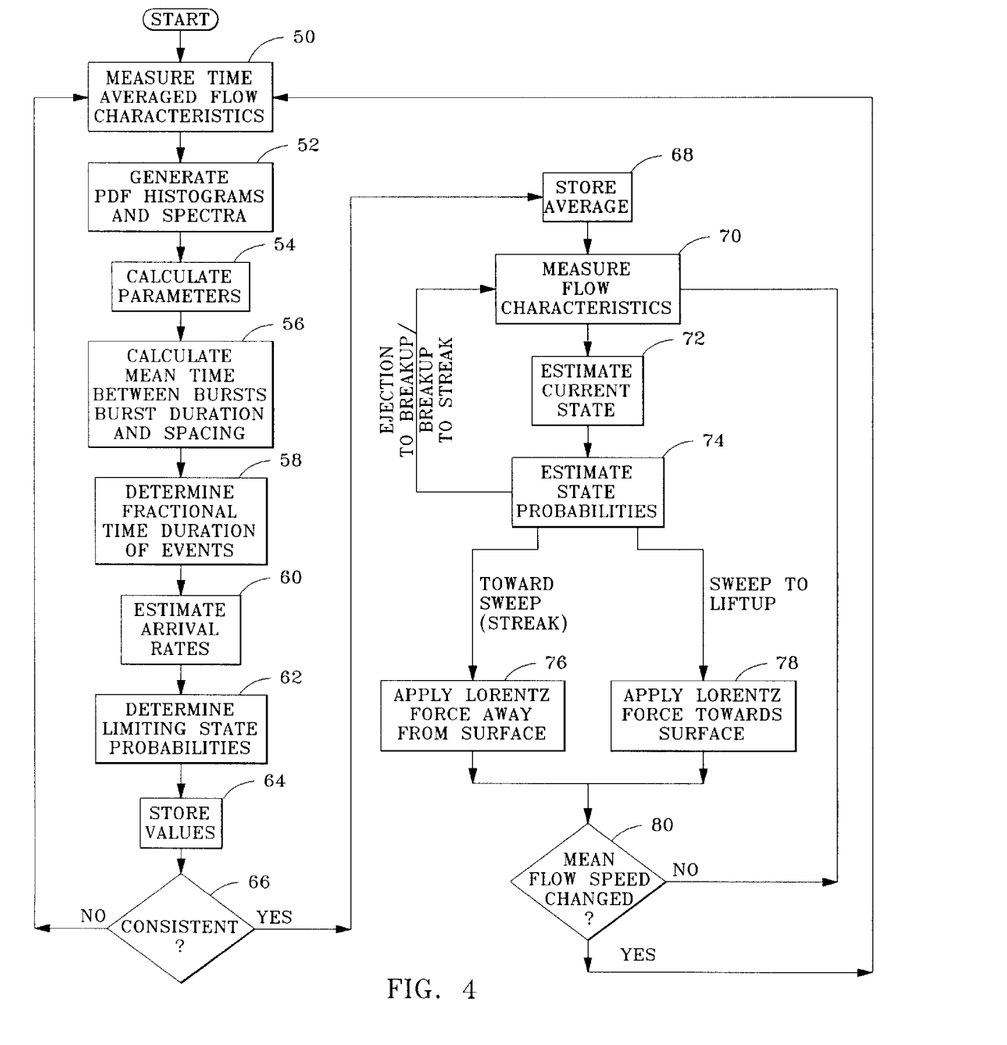
FIG. 4 is a flow chart of the method for actuating the Lorentz forces to control a turbulent flow.

As applied to characterizing and controlling wall layer turbulence, the methodology of the Markov transition is shown in the flow chart of FIG. 4. The first step 50, at time zero before the active control is turned on, is to measure in real time the flow characteristics of the fluid. These measurements can be accomplished using flush-mounted hot-film probes and miniature hydrophones, both well known in the art, to determine the wall shear stress and wall pressure fluctuation. In step 52, the wall shear stress and wall pressure fluctuation PDF histograms and spectra are generated by data processing, also well known in the art. The data processing also provides histograms of the key parameters, such as the time between bursts and the mean and variance of wall shear stress and wall pressure fluctuation. These are used in step 54 to calculate the dimensionless parameters, ($\sigma_w$/var $\sigma_w$) and (p'/var p'). In step 56, the established wall turbulence phenomenology models are applied to estimate the mean time between bursts, burst duration, and spacing. This information is used in step 58 to determine the fractional time duration of each event as normalized by the average mean time interval between burst arrivals $T_B$. Step 60 estimates the arrival rates p and the transition probabilities $\lambda$. In step 62, the limiting state probabilities are determined from the arrival rate using equations (6) and (7) and these values are then stored in step 64. Steps 50 through 64 are repeated for a number of $T_B$ periods, depending on the accuracy desired, as tested at step 66, after which average limiting state probabilities are determined and stored in step 68.

Once the flow characteristics have been identified, instantaneous measurements are again taken at step 70 and the current state is estimated at step 72 by comparing the shear stress and wall pressure fluctuations with the established PDF's. Then, step 74 applies the solutions to the unsteady state probability equations to estimate the state transition probability of the sensor location and determine the state probability of the current location within the next time step. The time step is determined by the lower bound of peak frequency, the upper bound and the desired accuracy. Values for the upper and lower bound have been found in the literature to be $\omega^+ \approx 0.52$ and $\omega^+ \approx 0.06$, respectively. One rule of thumb is to resolve the highest frequency with six intermediate time steps, which translates into a stepping frequency of $\omega^+ \approx 3$. Selection of the time step must balance the computational load and the accuracy desired.

Depending on the state transition probabilities determined in step 74, an external field is applied to control turbulence. If step 74 determines that the current state is low-speed streak and the next state is moving toward sweep, then a normal Lorentz; pressure gradient would be applied against the incoming high-momentum fluid motions at step 76. If the local state is currently ejection and is moving into breakup, or from breakup into low speed streak, then step 74 returns to step 70 to continue monitoring the current state. If the local state is a sweep moving into liftup, then step 78 applies a normal Lorentz pressure gradient in a direction towards the surface to prevent liftup and initiate a transition into low-speed streak. Once active turbulence control has been initiated at step 76 or 78, step 80 tests whether the mean flow speed has changed. If there is no change, control is returned to step 70 such that the instantaneous flow characteristics, as effected by the turbulence control, can be updated and the application of Lorentz forces begun again. If the mean flow speed has changed, step 80 returns control to step 50 and the complete process is begun again.

Figure 5:
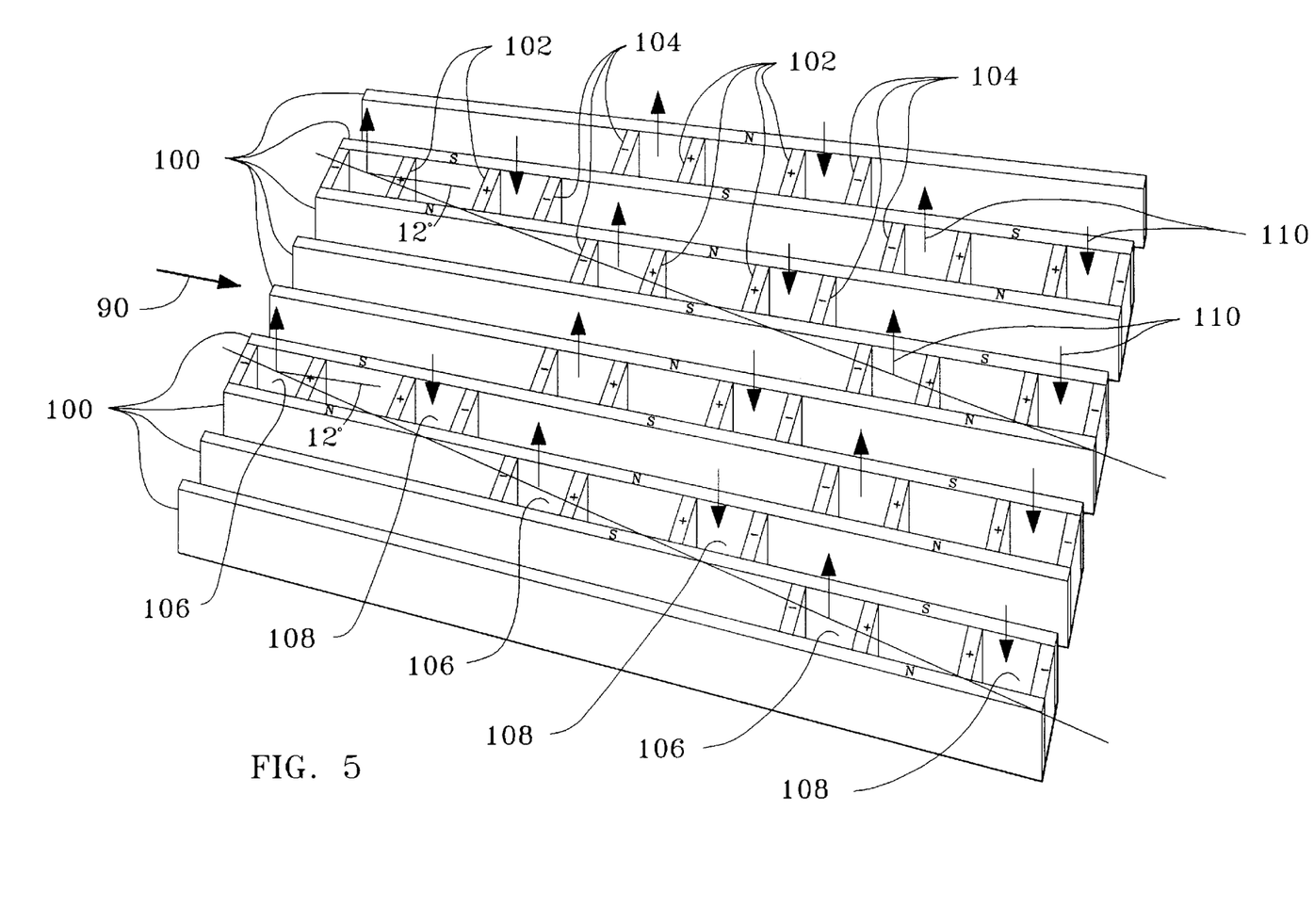
FIG. 5 is a partial isometric view of a magnet and electrode array in accordance with the present invention.

Referring now to FIG. 5, there is shown an array of micro-electrodes and magnets having a spatial pattern corresponding to the microturbulent event spatial pattern of FIG. 1. The flow direction is indicated by arrow 90. The array consists of bar magnets 100 having alternating north and south poles as shown. Positive electrodes 102 and negative electrodes 104 are spaced corresponding to the microturbulent events shown in FIG. 1 to form sweep inhibitor cells 106 and liftup inhibitor cells 108. The magnetic field between magnets 100 interacts with the electric field between electrodes 102 and 104 to produce a Lorentz force in the direction indicated by arrows 110, i.e., directed upwards out of the plane at sweep inhibitor cells 106 and downward into the plane at liftup inhibitor cells 108. It will be understood that any arrangement of magnets 100 and electrodes 102 and 104 which will produce Lorentz forces out of the plane of the array for sweep inhibitor cells 106 and into the plane of the array for liftup inhibitor cells 108 can be used. The streamwise and spanwise spacing of the inhibitors are based on the highest speed of operation, such that, when operating at that speed, the inhibitor spacing matches the spacing of the microturbulent events. When operating speed decreases, the polarity of selected electrodes can be reversed to be in-phase over larger spatial dimensions so as to adjust to the increasing spatial scales of the microturbulent events. Changes in flow speed are accommodated by the method of FIG. 4 by measuring flow speed at step 50 with any of a number of well known flow measuring devices. This information is used at steps 54 through 62 in determining the limiting state probabilities, which in turn are used in determining where the Lorentz forces are applied at steps 74, 76 and 78.

Figure 6:
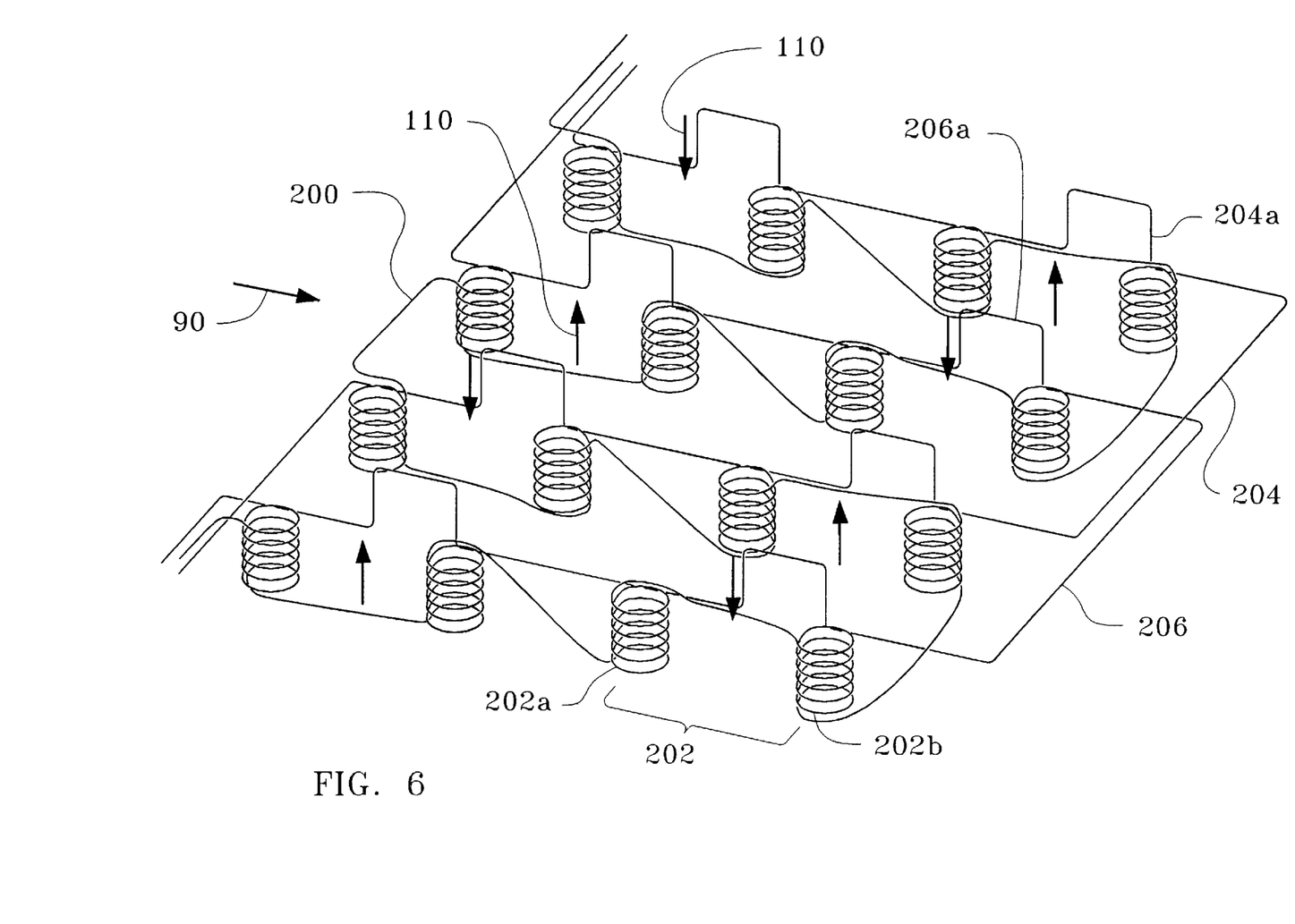
FIG. 6 is a schematic view of an electromagnet and electrode array in accordance with the present invention.

Magnets 104 in FIG. 5 may be permanent magnets or may be electromagnets as is shown in the embodiment of FIG. 6. A direct current conductor 200 is appropriately coiled to generate alternating pairs 202 of oppositely poled electromagnets 202a and 202b. An alternating current circuit having hot wire 204 and ground 206 creates the electric field with the AC electric field delivered directly into the electrically conducting medium. Hot wire loop 204 a is provided to one side of the centerline connecting electromagnet pairs 202, and ground wire loop 206a is provided on the opposite side of the centerline, such that the electric field between loops 204a and 206a is perpendicular to the magnetic field between electromagnets 202a and 202b. Depending on the direction of the magnetic and electric fields, Lorentz forces are generated, as indicated by arrows 110, to provide sweep and liftup inhibition corresponding to sweep and liftup inhibitor cells 106 and 108 of FIG. 5. For all practical applications, the dimensions of the arrays of FIGS. 5 and 6 are such that the spacing between magnets 202a and 202b are fractions of a millimeter. For example, for seawater at free stream velocity of 25 meters per second, the cell spacing would be approximately 100 microns. This array configuration would therefor lend itself to the circuitry manufacturing techniques of the microelectronics industry.

What has thus been described is a boundary layer control device for a surface which reduces turbulence by providing forces which counteract the microturbulent events occurring at the surface. The device has an array of magnet and electrode cells which are arranged to correspond with the spatial pattern of the naturally occurring microturbulent events. The cells are so constructed that the interaction of a magnetic field and an electric field generate a Lorentz force at the cell location. The Lorentz force may be directed into or out of the surface depending on the relative directions of the magnetic and electric fields. Sensors on the surface determine which cells to activate and in what direction to apply the Lorentz force. Since the device actively counteracts the microturbulent events at the surface, surface smoothness is not as critical as it is for prior art laminar flow control devices. One embodiment of the device has electrodes and electromagnets fabricated utilizing electronic circuitry techniques such that the device does not add appreciably to the weight or space requirements of the surface. While preferred embodiments of the invention have been disclosed in detail above, it should be understood by those skilled in the art that various other embodiments of the invention are possible. For example, in those applications where the surrounding medium is non-conductive, the device may be combined with slots on the surface which introduce a conducting medium adjacent the surface.

In light of the above, it is therefore understood that within the scope of the appended claims, the invention may be practiced otherwise than as specifically described.

What is claimed is:

1. A device for controlling discrete microturbulent events within a medium at a surface exposed to the medium, the microturbulent events having a determinable distribution over the surface, the device comprising:

an array of selectively activated cells distributed over the surface in corresponding relationship to the distribution of microturbulent events, each cell having an electric field generating means and a magnetic field generating means arranged such that activation of the cell results in an interaction of the electric field and the magnetic field at the cell, the interaction producing a Lorentz force at the cell in opposition to the microturbulent event being controlled; and a controller determining the state of the microturbulent events at the surface by differentiating between a liftup state, a burst state, a streak state and a sweep state of the microturbulent events and selectively activating the cells to produce the Lorentz forces opposing the state.

2. The device according to claim 1, wherein the controller selectively activates cells adjacent a liftup state to produce a Lorentz force normal to the surface in a direction towards the surface.

3. The device according to claim 1, wherein the controller selectively activates cells adjacent a sweep state to produce a Lorentz force normal to the surface in a direction away from the surface.

4. The device according to claim 1, wherein each magnetic field generating means comprises at least one pair of electromagnets having opposed poles so as to provide the magnetic field within the medium above the cell, the magnetic field bounded by the opposing poles.

5. The device according to claim 4, wherein each electric field generating means comprises at least one pair of electrodes arranged so as to have the magnetic field between the electrodes.

6. The device according to claim 5 wherein the controller determines a state of the microturbulent events, at the surface and selectively activates the pairs of electromagnets to generate the magnetic field to produce Lorentz forces opposing the state.

7. The device according to claim 6, wherein the controller selectively activates cells adjacent a liftup state to produce a Lorentz force normal to the surface in a direction towards the surface.

8. The device according to claim 6, wherein the controller selectively activates cells adjacent a sweep state to produce a Lorentz force normal to the surface in a direction away from the surface.

9. The device according to claim 1, wherein the controller further comprises:

a pressure sensor to measure pressure fluctuations at the surface; and a shear stress sensor to measure shear stress at the surface, the values of pressure fluctuation and shear stress being used to determine the state of the microturbulent events.

10. The device according to claim 1, wherein each magnetic field generating means comprises at least one permanent magnet having opposed poles so as to provide the magnetic field within the medium above the cell, the magnetic field bounded by the opposing poles.

11. The device according to claim 10, wherein each electric field generating means comprises at least one pair of electrodes arranged so as to have the magnetic field between the electrodes.

* * * * *